United States Patent [19]

Kroyer

[11] 4,014,635

[45] Mar. 29, 1977

[54] APPARATUS FOR THE DEPOSITION OF A UNIFORM LAYER OF DRY FIBRES ON A FORAMINOUS FORMING SURFACE

[76] Inventor: Karl Kristian Kobs Kroyer, Banegardsplads 4, DK-8100 Arhus C., Denmark

[22] Filed: Oct. 29, 1975

[21] Appl. No.: 626,973

[30] Foreign Application Priority Data

Oct. 31, 1974 United Kingdom ............. 47182/74

[52] U.S. Cl. .................................... 425/82; 425/83; 425/217; 19/156.3

[51] Int. Cl.$^2$ ....................... B29C 13/00; B29J 5/00

[58] Field of Search ....................... 425/217, 73, 82; 19/156.3

[56] References Cited

UNITED STATES PATENTS

| | | | |
|---|---|---|---|
| 2,811,195 | 10/1957 | Kloss | 425/83 X |
| 3,395,426 | 8/1968 | Langdon | 19/156.3 |
| 3,551,250 | 12/1970 | Paoletti | 425/217 X |
| 3,672,803 | 6/1972 | Rees | 425/217 X |
| 3,768,120 | 10/1973 | Miller | 19/156.3 |

*Primary Examiner*—Robert L. Spicer, Jr.
*Attorney, Agent, or Firm*—Watson, Cole, Grindle & Watson

[57] ABSTRACT

An apparatus for the deposition of dry fibres on a gas permeable wire comprising in combination a hammer mill having a lower perforated wall, a fibre distributor comprising a housing having a perforated plane-surfaced bottom wall, at least one plate member being located within said housing and extending inwardly from the inside of the side walls of said housing to divide it into an upper part and a lower part, a feed pipe connecting the hammer mill with the fibre distributor and a recycle pipe connecting the upper part of the housing of the distributor with the hammer mill.

8 Claims, 2 Drawing Figures

APPARATUS FOR THE DEPOSITION OF A UNIFORM LAYER OF DRY FIBRES ON A FORAMINOUS FORMING SURFACE

BACKGROUND OF THE INVENTION

This invention relates to an apparatus for the deposition of a uniform layer of fibres on a foraminous forming surface. More particularly the invention relates to an apparatus for continuously producing a web of randomly disposed fibres or agglomerates of fibres on a wire.

In a prior art machine a fibrous material, such as fibre pulp is delivered to a hammer mill comprising a lower curved perforated wall partially encircling the space within which the hammers are rotating. The hammer mill is located above an endless forming wire passing above a suction box.

A fibrous material is introduced into the hammer mill and is disintegrated therein so as to form loose fibres which after passage through the perforated wall flow towards the wire under the influence of the vacuum created in the suction box. These fibres are deposited on the wire so as to form a fibre layer which is then further treated, i.e. by introducing therein a binder which subsequently is cured.

In another prior art machine a stream of air containing suspended fibres is introduced into a fibre distributor comprising a housing having a perforated plane-surfaced bottom wall and a stirrer having impellers rotating a short distance above and in non-contacting relationship with the upper surface of said perforated bottom wall.

Said bottom wall is preferably mounted shortly above a wire and on the opposite side of said wire a suction box is mounted. During the rotation of the impellers the fibres introduced into said housing are distributed over said wire so as to form a fibre layer thereon, and said fibre layer is then further treated as mentioned above.

The object of the invention is to provide an improved apparatus for producing fibrous sheets or webs of uniform thickness and consistency.

A second object is to provide an apparatus comprising a fibre distributor having an improved capacity.

A further object is to provide an apparatus which can be used in connection with a suction box of reduced capacity.

A still further object is to provide an apparatus permitting an easily controllable recycling of fibre lumps from the distributor to the disintegrator.

SUMMARY OF THE INVENTION

In accordance with the present invention there is provided an apparatus for the production of fibrous sheets or webs, said apparatus comprising in combination:

1. a hammer mill comprising a lower perforated wall, inlet means for fibrous material to be disintegrated, and inlet means for recycled fibrous material;

2. a conduit for transporting disintegrated fibrous material from the hammer mill to a fibre distributor;

3. a fibre distributor comprising a housing having a perforated plane-surfaced bottom wall, one or more stirrers having impellers rotating a short distance above and in non-contacting relationship with the upper surface of said perforated bottom wall, at least one plate member located above said impellers and extending inwardly from the inside of the side walls of the housing so as to form a partition between a lower part and an upper part of said housing, inlet means for disintegrated material opening into said upper part of the housing, said upper part of the housing also comprising outlet means for fibrous material to be recycled to the hammer mill; and 4. a conduit connecting the outlet means of said housing with said inlet means of said hammer mill.

Surprisingly, the provision of said plate member within the housing of the fibre distributor as well as said conduit for recycling fibrous material from the fibre distributor to the hammer mill has significantly improved the efficiency of the fibre distributor. The said plate member serves to maintain a constant amount of fibres in the zone in which the impellers are rotating and to avoid that fibres present in said zone are recycled to the hammer mill. Furthermore, the said plate member ensures that the rotation of fibres within said zone is undisturbed by the recycling, and consequently a more uniform distribution of fibres on the underlying wire is obtained.

The plate member also serves as a fibre classifier, because the fibrous material tends to be separated during the rotational movement into fibre lumps and separate fibres, the fibre lump floating on the fibres and consequently mainly above the plate member. Thus, the recycled material mainly consists of fibre lumps which should be subjected to a further disintegration in the hammer mill.

The possibility of operating the hammer mill under such conditions that only a partial defibration of the fibrous material is effected, e.g. a defibration of about 95% of the fibrous material without disturbing the operation of the fibre distributor, has the effect of strongly increasing the capacity of the hammer mill. Thus, it is well known that a complete defibration is much more difficult to achieve than a defibration of e.g. 95% of the fibrous material.

In a preferred embodiment of the invention a fan is incorporated in the conduit connecting the outlet means of said housing with the recycle inlet means of the hammer mill. This fan serves to maintain a stream of air containing fibrous material to be recycled to the hammer mill.

In order to adjust the recycle stream, the recycling conduit is preferably also provided with an adjustable air slot permitting additional air to be supplied to the hammer mill.

The hammer mill is preferably of the type in which the material to be disintegrated is introduced through a slot incorporating an adjustable supporting plate. Thus, by adjusting the distance between the edge of said supporting plate and the tips of the rotating hammers, the degree of defibration may be controlled. Also by using different perforated plates, various degrees of defibration can be obtained.

The conduit connecting the hammer mill with the fibre distributor preferably comprises a fan which not only serves the purpose of transporting the disintegrated material from the hammer mill to the fibre distributor, but also of adjusting the rate at which air flows through the hammer mill. This flow rate also influences the degree of defibration.

The fibre distributor preferably comprises two rollers extending parallel to the front and back walls, respectively, of the housing of said distributor.

These rollers serve to reduce the introduction of false air through the gaps between the lowermost edges of said housing and the upper edges of the suction box mounted below the wire on which the fibre layer is to be formed.

By using such rollers it has been made possible to reduce the consumption of air necessary for the formation of said fibre layer by up to 50 percent.

These rollers may be positively driven by suitable driving means or may roll on the underlying wire.

By reducing the air consumption the capacity of the suction box can be reduced correspondingly. Furthermore, the problems involved in filtering the air passing through the suction box and containing some suspended fibres are also reduced.

The rollers are preferably mounted such that narrow slots are formed between the lowermost edges of the housing and the surfaces of the rollers. By providing such a slot, a stream of air passes into the housing at the lowermost edges of said housing, and the accumulation of fibres at the edges of the perforated plane-surfaced bottom wall of the housing is avoided.

In case of high production rates, i.e. 150 m/minutes, the rollers are preferably mounted in non-contacting relationship with the wire.

The ends of the housing are preferably also provided with walls having lower edges ending shortly above the wire. In this manner the flow of false air from the ends of the housing may also be reduced or prevented. This has not only the effect of reducing the air consumption, but also serves to avoid disturbance of the fibre layer formation at the edges of the web.

DESCRIPTION OF A PREFERRED EMBODIMENT

Figure 1:
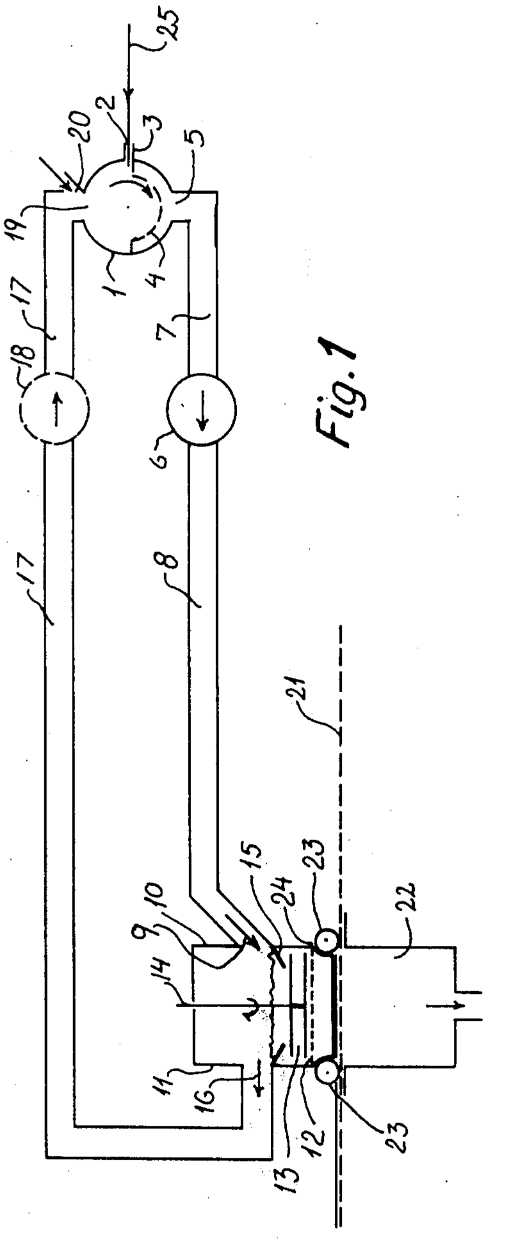
FIG. 1 schematically shows a vertical sectional view of a preferred embodiment of the apparatus of the invention.
Figure 2:
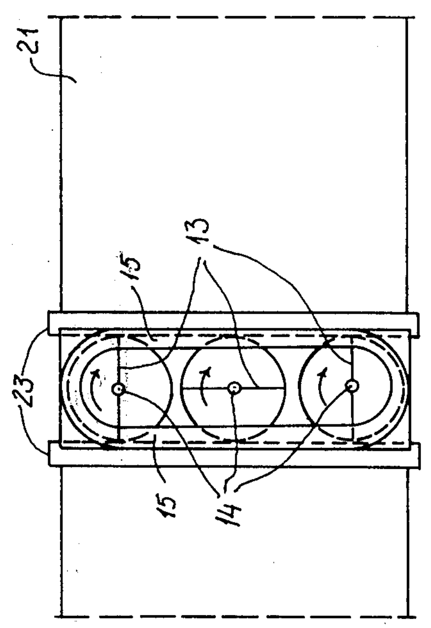
FIG. 2 shows a schematic horizontal sectional view of the fibre distributor illustrated in FIG. 1.

The apparatus of the drawings comprises a hammer mill 1 comprising an inlet opening 2 for fibrous material to be disintegrated, said inlet opening having an adjustable support plate 3 which can be adjusted relative to the axis of the hammer mill 1. The hammer mill 1 also comprises a perforated lower wall 4. At the bottom of the hammer mill 1 there is provided an outlet 5 which is connected to a fan 6 by a pipe 7. A further pipe 8 connects the fan 6 with an inlet 9 of a fibre distributor 10.

The fibre distributor 10 comprises a housing 11, a plane-surfaced perforated bottom wall 12, three sets of impellers 13 which are mounted for rotation around vertical axes 14, said impellers being mounted shortly above the plane-surfaced bottom wall 12.

The housing also comprises an inclined plate 15 extending inwardly from the inner walls of said housing 11. Above said plate 15 there is an outlet 16 which is connected to a recycle pipe 17 comprising a fan 18. The pipe 17 is connected to a recycle inlet opening 19 in the hammer mill 1. Shortly above said inlet opening 19 there is provided an adjustable air slot 20 in the pipe 17.

A wire 21 is continuously passed below the bottom wall 12 of said housing 10, and a suction box 22 located below said wire 21. At the front and back walls of the housing there are provided two rollers 23 which are mounted for rotation around an axis extending transversely of the direction of movement of the wire 21.

These rollers are mounted in a manner that gaps 24 are formed between the lower edges of the housing 10 and the roller surfaces. The rollers may be positively driven or may rotate on the wire 21.

A raw material such as paper pulp 25 is introduced into the inlet opening 2 and is disintegrated in the hammer mill 1. When the material introduced into the hammer mill has been disintegrated to such an extent that the particles may pass through the perforated wall 4, these particles are transported through the pipe 7, the fan 6 and the pipe 8 into the distributor 10, in which they are subjected to the influence of the rotating impellers 13. During the rotation of said impellers 13, the fibrous material is classified in a relatively fine material contained in the lower part of the housing 10, i.e. in the zone below the plate 15 and a relatively coarse material contained in the zone above said plate 15. The relatively coarse material is recycled to the hammer mill 1 through the pipe 17 and the fan 18. The rate of circulation and the flow conditions within the hammer mill are adjusted by adjusting the slot 20 which permits air to be sucked into the hammer mill 1. During the rotation of the impellers 13 the fibrous material contained in the lower part of the housing 10 is distributed over the full width of the wire 21 so as to form a uniform layer thereon. The deposition of the fibre layer on the wire 21 is effected by a stream of air generated in the suction box 22. The rollers 23 act as sealing members so as to avoid the intake of false air. The provision of the gaps 24 ensures that air streams are formed at the lower edges of the walls of the housing, and these air streams prevent fibres from being accumulated at said edges.

I claim:

1. An apparatus for the deposition of a uniform layer of dry fibres on a foraminous forming surface, said apparatus comprising in combination:

1. a hammer mill comprising a lower perforated wall, inlet means for fibrous material to be disintegrated, and inlet means for recycled fibrous material;
   2. a conduit for transporting disintegrated fibrous material from the hammer mill to a fibre distributor;
   3. a fibre distributor comprising a housing having a perforated plane-surfaced bottom wall, at least one stirring device having at least one impeller disposed for rotation a short distance above and in non-contacting relationship with the upper surface of said perforated bottom wall, at least one plate member located above said impeller and extending inwardly from the inside of the side walls of the housing so as to form a partition between a lower part and an upper part of said housing, inlet means for disintegrated material opening into said upper part of the housing, said upper part of the housing also comprising outlet means for fibrous material to be recycled to the hammer mill; and
   4. a conduit connecting the outlet means of said housing with said inlet means of said hammer mill.

2. An apparatus as in claim 1, wherein a fan is provided in the conduit connecting the outlet means of said housing with the recycle inlet means of said hammer mill.

3. An apparatus as in claim 2, wherein the conduit connecting the outlet means of said housing with the recycle inlet means of said hammer mill includes an opening provided in the wall of said conduit, and means provided for adjusting the size of said opening so as to control the flow of air passing therethrough.

4. An apparatus as in claim 1, wherein a fan is provided in the conduit connecting the hammer mill with the fibre distributor.

5. An apparatus as in claim 1, wherein the fibre distributor comprises two rollers extending parallel to the front and back walls, respectively, of the housing of said fibre distributor.

6. An apparatus as in claim 5, wherein said rollers are in non-contacting relationship with the forming surface.

7. An apparatus as in claim 5, wherein the rollers are mounted so that narrow slots are formed between the lowermost edges of the walls of the housing and said rollers.

8. An apparatus as in claim 1, wherein the lower edges of the end walls of the housing are located shortly above the forming surface.

* * * * *